United States Patent Office 3,205,180
Patented Sept. 7, 1965

3,205,180
TREATMENT OF LUBRICATING OILS
Jacques Demeester, Paris, France, assignor to The British Petroleum Company Limited, London, England, a British joint-stock corporation
No Drawing. Filed Nov. 16, 1961, Ser. No. 152,926
9 Claims. (Cl. 252—439)

This application is a continuation-in-part of U.S. Serial No. 808,862, filed April 27, 1959, now U.S. Patent 3,020,228.

This invention relates to the treatment of lubricating oils, and relates more particularly to catalytic hydrogenation processes for the treatment of lubricating oils, to catalysts therefore, and to the preparation of such catalysts.

Catalytic reforming processes have made available to petroleum refineries considerable quantities of gases rich in hydrogen, thus rendering economically attractive methods of refining by means of hydrogen, in particular the refining hydrogenation of lubricating oil fractions, hereinafter referred to as hydrofinishing.

Applicant has studied the hydrofinishing of lubricating oils as a final treatment for these oils in place of the conventional treatment with clay. The object of this final treatment is to give the oil in the first place a satisfactory colour and appearance and in the second place a suitable heat and storage stability. As in the case of clay treatment, there should be no important change in the molecular structure of the oil, in particular there should be no appreciable drop in viscosity.

Numerous catalytic hydrogenation processes for lubricating oils are known; certain use conditions sufficiently severe to change the structure of the oil and produce a drop in viscosity. It is possible at this price to obtain a satisfactory colour and stability. In particular, at temperatures above 340° C., one can hydrogenate lubricating oils over a catalyst consisting of the oxides of cobalt and molybdenum on alumina, and this hydrogenation produces a suitable colour and stability with a more or less appreciable drop in viscosity.

If one wishes to avoid an appreciable drop in viscosity, it is necessary to work at temperatures below 340° C., and under this condition hydrogenation with conventional catalysts consisting of the oxides of cobalt and molybdenum on an alumina support easily gives the desired colour, but does not always give a sufficient stability. This difficulty is more apparent in the case of oils which have not been solvent refined and which usually need to be treated with sulphuric acid and clay. For present purposes, stability is expressed by the index of reversion, defined hereinafter for non solvent-refined oils, and by the B.A.M. oxidation test in the case of solvent-refined oils (I.P. Method No. 48).

Applicant has investigated the operating conditions and the catalysts capable of effecting hydrofinishing to produce oils of suitable colour which are also heat and storage stable, whether or not the oils have been previously solvent refined, and without appreciable modification of the molecular structure of the oils, that is to say without appreciable drop in viscosity.

The process has been studied particularly for the treatment of distillate oils from crude petroleums of paraffinic or mixed base, but can equally be applied to oils from other crude petroleums, bituminous shales and synthetic oils.

According to the invention, these oils are refined with hydrogen at temperatures between 150° and 340° C., preferably between 250° and 320° C., using a catalyst consisting of alumina and the oxides of molybdenum and iron, the oxides being supported on the alumina. The catalyst in addition to the oxides of molybdenum and iron, may also contain the oxide of cobalt.

The refining pressure may vary between 5 atmospheres (ats.) and 70 atmospheres (ats.) more or less, as mentioned above, but in practice one will preferably use a pressure corresponding to the pressure of the hydrogen-rich gases from catalytic reforming processes which may be at 20–30 ats. The hydrogen feed rate is also variable but low, being from 5 to 150 vols. per vol. (v./v.) of oil under normal conditions. A preferred value is 23 vols. per vol. of oil. The oil feed rate can vary from 0.5 to 6 vols. of oil per vol. of catalyst per hour, the higher values being suitable for solvent-refined oils.

The process according to the invention gives oils of satisfactory color, but also produces oils of a heat and storage stability very much superior to that obtained with the traditional catalyst, consisting of the oxides of molybdenum and cobalt, under the same operating conditions, and does so without appreciable drop in viscosity of the oil. The nature and method of manufacture of the catalyst used in the refining operation are important for good results.

When the catalyst consists of alumina and the oxides of molybdenum and iron, the total quantity of said oxides should be at least 10 percent of the total catalyst composition weight, and the quantity of iron oxide should be at least 6 percent of the total catalyst composition weight. Within these limits, particularly good results are achieved when the quantity of iron oxide is at least equal to the quantity of molybdenum oxide.

The catalyst consisting of alumina and the oxides of molybdenum and iron has the following preferred composition of oxides, in terms of the content of the oxides and the alumina individually as a percentage of the total catalyst weight.

| | Percent |
|---|---|
| $MoO_3$ | 8 |
| $Fe_2O_3$ | 12 |

The alumina support is preferably gamma alumina.
The proportions of the two oxides may, however, vary as follows:

| | Percent |
|---|---|
| $MoO_3$ | 4–12 |
| $Fe_2O_3$ | 6–20 |

If the oxide of cobalt, CoO, is added to the oxides of molybdenum and iron, the preferred composition measured in the same terms as indicated hereinabove, is:

| | Percent |
|---|---|
| $MoO_3$ | 9 to 10 |
| $Fe_2O_3$ | 10 to 12 |
| CoO | 2 to 5 | on an alumina support, preferably gamma alumina.
One can vary the above values within the following limits:

| | Percent |
|---|---|
| $MoO_3$ | 3 to 20 |
| $Fe_2O_3$ | 4 to 20 |
| CoO | 1 to 12 | in such a manner that the ratio $MoO_3/CoO$ is about 3:1 and the content of $Fe_2O_3$ is as high as possible, compatible with the porosity of the catalyst support. In any case, the ratio $MoO_3:CoO$ should be above 2:1 when 5 percent $Fe_2O_3$ is used and above 1.5:1 when 10 percent $Fe_2O_3$ is used. Preferably, the ratio of $MoO_3$ to CoO is at least equal to 1.5:1 in which event the minimum content of iron oxide is about 10 percent of the total catalyst weight when the weight ratio of molybdenum oxide to cobalt oxide is equal to 1.5:1, progressively less than 10 percent of the total catalyst weight as said ratio increases from 1:5:1 to 3:1, 4 percent of the total catalyst weight when said ratio is in the region of 3:1, and progressively more than 4 percent of the total catalyst weight as said ratio increases above 3:1.

In all cases the catalyst according to the invention can be sulphurized before using.

Applicant has also discovered that the method of preparation of the catalyst is an important factor in determining its activity.

In particular, catalysts prepared by the traditional method by coprecipitation of the alumina and of the salts of the metals of iron, molybdenum and cobalt, have an activity very much less than that obtained by the method of preparation according to the invention. The same applies to the method of impregnation of the freshly precipitated wet alumina gel with solutions of the above salts.

According to a further feature of the invention, catalysts, consisting of the oxides of molybdenum, iron and, if desired, cobalt on alumina support are prepared using granular alumina already calcined. The alumina is preferably an activated alumina obtained by the calcination of hydrargillite at above 500° C. The macrostructure of this alumina should be relatively loose in order to permit the impregnation of a sufficient quantity of ferric nitrate solution which is a difficult matter.

By way of non-limiting example, a suitable alumina has pores of approximately 30 angstroms. Its active surface is 250 square metres per gram and the volume of pores 35 cubic metres per 100 grams.

The above alumina should first of all be impregnated with a solution of ferric nitrate, and the acidification of this solution favors impregnation. This acidification is preferably effected by means of nitric acid up to a pH in the neighborhood of 0. The impregnation should be effected by soaking the alumina in the ferric nitrate solution or by wetting the alumina with the solution or by any other equivalent method.

The impregnation of the alumina is followed by drying at 110° C., then by calcination at 550° C.

The alumina already impregnated with the oxide of iron $Fe_2O_3$, is then impregnated with a solution of ammonium molybdate. The use of an ammoniacal solution of ammonium molybdate is necessary to facilitate impregnation of this salt and avoid its precipitation in contact with the alumina. One dries at 110° C. and calcines at 550° C. If it is desired to introduce cobalt into the catalyst, the impregnation with cobalt nitrate should be effected last, following the drying and calcination at 550° C. If desired, the calcination between the impregnation with the ammonium molybdate and with the cobalt nitrate may be dispensed with but the catalyst then runs the risk of being less homogeneous and less active.

A catalyst prepared according to the invention as described above is still not capable of giving the desired results. In order that it may give its full effect in the process according to the invention, it is necessary to submit it to a preliminary activation treatment which is most conveniently carried out in the hydrogenation reactor in which it will be used.

According to the invention, this activation treatment is effected by passing over the catalyst a mineral lubricating oil, preferably fluid and non-refined, under a pressure of hydrogen and at a temperature above or equal to 300° C. for a period of at least 24 hours. Satisfactory conditions would be, for example:

| | |
|---|---|
| Temperature | 325° C. |
| Space velocity of oil per volume of catalyst | 1 vol./vol./hr. |
| Pressure | 20 atmospheres. |
| Feed rate of hydrogen | 20 vol. per. vol. of oil per hour. |
| Duration | 48 hours. |

While the temperature of at least 300° C. is a critical condition, the other conditions can be varied within large limits.

The invention will now be described by way of example with reference to the hydrofinishing of lubricating oil fractions from a Kuwait crude petroleum.

EXAMPLE 1.—HYDROFINISHING OF A DEWAXED BUT NON-SOLVENT-REFINED OIL FRACTION

The oil treated had the following properties:

| | |
|---|---|
| Density, 15/15° C. | 0.910 |
| Viscosity in cs.: | |
| At 37.8° C. | 23.7 |
| At 50° C. | 14.6 |
| Viscosity index | 47 |
| Flashpoint, ° C. | 200 |
| Pour point, ° C. | −24 |
| Acid index (Mg KOH/gr.) | 0.22 |
| Sulphur, percent wt. | 2.9 |

This oil was hydrogenated under the following conditions:

| | |
|---|---|
| Hydrogen pressure | 20 ats. |
| Hydrogen feed rate | 25 liters/liter of oil. |
| Space velocity | 1 vol./vol./hour. |
| Temperature | From 250–340° C. by increments of 25° C. |

These conditions do not produce any appreciable drop in viscosity and the yield of oil is always very near 100%. The acid index of the hydrogenated oil is lowered to values of the order of 0.01.

For each treating temperature, the color of the oil was measured as expressed by light absorption using a photocolorimeter Bonet-Maury through a Wratten screen No. 7. The stability was expressed by comparing the color of a sample before and after artificial aging for 16 hours at 85° C. in the presence of air. The ratio between the light absorptions gives what one calls the "index of reversion" of the oil, an expression of its stability.

Index of reversion=

$$\frac{\text{Absorption of the artificially aged oil}}{\text{Absorption of the fresh oil}}$$

For each catalyst studied under the above conditions, one can plot by this method the graph of the index of reversion as a function of the hydrogenation temperature. The lowest index of reversion (i.e., the maximum stability) corresponding in each case to a temperature between 275 and 320° C., has been shown in Table 1 as well as the color of the hydrogenated oil, expressed by its light absorption by the photocolorimeter.

Table 1 sets out the results obtained with catalysts of the same granular form based upon the same gamma alumina and comprising different proportions of the oxides of molybdenum, iron and cobalt.

The traditional catalysts consisting of the oxides of molybdenum and cobalt, give a maximum stability expressed by an index of reversion of 1.47 when the ratio $MoO_3/CoO$ is equal to 3/1 and with 20% total active oxides.

The catalysts consisting of the oxides of molybdenum and iron give a maximum stability expressed by an index of reversion of 1.38 with 20% total active oxides of which only 8% is $MoO_3$, which shows the considerable effect of $Fe_2O_3$ in place of CoO.

The catalysts consisting of the oxides of molybdenum, iron and cobalt give maximum stabilities always for a ratio of $MoO_3/CoO$ of about 3. The corresponding indices of reversion are lower according as the content of $Fe_2O_3$ is higher:

| Percent $Fe_2O_3$: | Index of reversion |
|---|---|
| 0 | 1.47 |
| 5 | 1.37 |
| 10 | 1.28 |

These figures illustrate the considerable effect of $Fe_2O_3$ on the stability of the oil.

Table 1.—Hydrofinishing of a spindle oil from Kuwait crude

|  | Percent wt. active oxides in the catalyst | | | Total percent active oxides | Ratio by wt., MoO₃/CoO | Color (light absorption) | Minimum index of reversion |
|---|---|---|---|---|---|---|---|
|  | MoO₃ | Fe₂O₃ | CoO | | | | |
| Catalyst MoCo, without Fe₂O₃ | 5 | 0 | 12 | 17 | 0.4 | 8.3 | 2.40 |
|  | 5 | 0 | 6 | 11 | 0.8 | 8.9 | 2.06 |
|  | 5.5 | 0 | 4.5 | 10 | 1.2 | 10.3 | 1.79 |
|  | 10 | 0 | 5 | 15 | 2 | 9.9 | 1.52 |
|  | 15 | 0 | 5 | 20 | 3 | 10.5 | 1.47 |
|  | 16 | 0 | 4 | 20 | 4 | 10.5 | 1.54 |
| Catalyst MoFe | 4 | 4 | | 8 | | 11.2 | 1.50 |
|  | 8 | 4 | | 12 | | 9.7 | 1.54 |
|  | 12 | 4 | | 16 | | 10.0 | 1.54 |
|  | 4 | 8 | | 12 | | 11.1 | 1.44 |
|  | 8 | 8 | | 16 | | 9.6 | 1.47 |
|  | 12 | 8 | | 20 | | 9.9 | 1.45 |
|  | 4 | 12 | | 16 | | 11.2 | 1.39 |
|  | 8 | 12 | | 20 | | 9.6 | 1.38 |
|  | 12 | 12 | | 24 | | 10.0 | 1.37 |
| Catalyst MoCo with 5% Fe₂O₃ | 5 | 5 | 12 | 22 | 0.4 | 9.3 | 1.66 |
|  | 5 | 5 | 6 | 16 | 0.8 | 8.4 | 1.55 |
|  | 10 | 5 | 6 | 21 | 1.7 | 7.8 | 1.45 |
|  | 12 | 5 | 5 | 22 | 2.4 | 9.5 | 1.38 |
|  | 15 | 5 | 5 | 25 | 3 | 10.2 | 1.37 |
|  | 18 | 5 | 5 | 28 | 3.6 | 11 | 1.38 |
|  | 20 | 5 | 5 | 30 | 4 | 11 | 1.40 |
| Catalyst MoCo with 10% Fe₂O₃ | 5 | 10 | 12 | 27 | 0.4 | 9.8 | 1.60 |
|  | 5 | 10 | 6 | 21 | 0.8 | 8.5 | 1.48 |
|  | 10 | 10 | 6 | 26 | 1.7 | 7.7 | 1.38 |
|  | 12 | 10 | 5 | 27 | 2.4 | 9.5 | 1.29 |
|  | 15 | 10 | 5 | 30 | 3 | 10.4 | 1.28 |
|  | 18 | 10 | 5 | 33 | 3.6 | 10.6 | 1.28 |
|  | 20 | 10 | 5 | 35 | 4 | 11 | 1.30 |

EXAMPLE II.—HYDROFINISHING OF A DEWAXED AND NON-SOLVENT-REFINED OIL FRACTION

The conditions of treatment were the same as in Example 1, with a temperature of 310° C. Table 2, first part, gives the complete analysis of the initial oil, of the oil hydrogenated over the conventional molybdenum and cobalt oxides catalyst, of the oil hydrogenated over a molybdenum, iron and cobalt oxides catalyst, and also of the oil refined by means of sulphuric acid and clay.

One sees that the colours obtained are the same by the three treating processes, but the best index of reversion is that obtained with the molybdenum, iron and cobalt oxides catalyst which is only slightly inferior to that of the oil which had been subjected to the conventional treatment with sulphuric acid and clay.

The viscosity of the oil is practically unchanged and the acid index is practically nil.

EXAMPLE III.—HYDROFINISHING OF A VISCOUS RESIDUAL OIL TREATED WITH FURFURAL AND DEWAXED

The conditions of treatment were the same as in Example 1, except that the temperature was 310° C. Table 2, second part, gives the complete analysis of the initial oil, of the oil hydrogenated over the traditional molybdenum and cobalt oxides catalyst, of the oil hydrogenated over a molybdenum, iron and cobalt oxides catalyst, and also of the oil refined with clay.

The colour of the refined oil is best for the hydrogenating treatment, especially with the molybdenum, iron and cobalt oxides catalyst. The stability is here expressed by the B.A.M. artificial ageing test (I.P. Method No. 48). This very severe test, which can only be used for the less volatile oils treated with selective solvents, shows that the best stability is obtained with the catalyst containing Fe₂O₃.

The drop in viscosity is very small and the yield of refined oil by hydrogenation is nearly 100%.

Table 2.—Hydrofinishing of Kuwait lubricating oils

|  | Spindle oil (non-furfural refined) | | | | Viscous residual oil (refined with furfural) | | | | Methods used |
|---|---|---|---|---|---|---|---|---|---|
|  | Feedstock | Hydrogenated oil | | Oil treated with acid 1%, clay 5% | Feedstock | Hydrogenated oil | | Oil treated with 3% of clay | |
|  |  | Catalyst Co-Mo[1] at 310° C. | Catalyst Fe-Co-Mo[2] at 310° C. |  |  | Catalyst Co-Mo[1] at 310° C. | Catalyst Fe-Co-Mo[2] at 310° C. |  |  |
| Specific gravity, 15/15° C | 0.910 | 0.909 | 0.909 | 0.910 | 0.905 | 0.904 | 0.904 | 0.902 | NFT 60.101. |
| Viscosity centistokes at: | | | | | | | | | |
| 37.8° C | 23.7 | 21.5 | 22.4 | 23.3 | 611.2 | 581.8 | 589.6 | 600.3 | IP. 71. |
| 50° C | 14.6 | 13.5 | 14.1 | 14.5 | 287.3 | 275.4 | 278.1 | 283.1 | IP. 71. |
| 99° C | 4.00 | 3.8 | 3.9 | 4.00 | 35.2 | 34.2 | 34.3 | 34.7 | IP. 71. |
| Index of viscosity | 47.1 | 49.5 | 43.2 | 49.1 | 97.8 | 97.9 | 97.6 | 97.4 | IP. 73. |
| Flash point, ° C | 200 | 197 | 197 | 202 | 286 | 284 | 286 | 291 | NFT 60.103. |
| Carbon Ramsbottom, percent | 0.12 | 0.11 | 0.10 | 0.10 | 0.45 | 0.43 | 0.43 | 0.45 | ASTM D.524. |
| Pour point, ° C | −24 | −24 | −24 | −24 | −12 | −9 | −9 | −9 | ASTM D.97. |
| Acid index (mg. KOH/gr.) | 0.225 | 0.011 | 0.011 | 0.070 | 0.004 | 0.004 | 0 | 0 | NFT 60.112. |
| Colour NPA | 2½− | 1½− | 1½− | 1½+ | 3½ | 2½ | 3½− | 3½− | ASTM D.155. |
| Index of reversion | | 1.8 | 1.3 | 1.4 | | 1.2 | 1.1 | 1.1 | See text. |
| Sulphur content, percent wt | 2.9 | 2.4 | 2.3 | 2.9 | 1.7 | 1.6 | 1.5 | 1.7 | NFT 60.108. |
| B.A.M. oxidation test: | | | | | | | | | |
| Ramsbottom carbon increase | | | | | 1.04 | 0.60 | 0.52 | 0.76 | IP. 48. |
| Viscosity ratio | | | | | 1.47 | 1.32 | 1.25 | 1.35 | |

[1] Composition 14.1% MoO₃—2.9% CoO on alumina.
[2] Composition 10% MoO₃—5% CoO—10% Fe₂O₃ on alumina.

EXAMPLE IV.—PREPARATION OF CATALYST COMPRISING THE OXIDES OF IRON, MOLYBDENUM AND COBALT ON ALUMINA ($Fe_2O_3$: 12%, $MoO_3$: 8.5%, CoO: 2.5%)

The catalyst support is a granular alumina of 1 to 3 m./m. obtained by the calcination of hydrargillite at 500° C. This alumina has pores of 30 angstroms and an active surface of 250 square metres per gramme. The volume of the pores is 35 cubic centimetres per 100 gr., which enables it to be impregnated easily with an appreciable quantity of ferric nitrate solution.

This alumina was first impregnated by soaking at ambient temperature in an acid solution of pH approximately 0 of 45% by weight ferric nitrate $(NO_3)_3Fe,9H_2O$. The quantity of solution corresponds to an equal proportion by weight of nitrate of iron and alumina. Soaking was continued for 36 hours. The alumina was allowed to drain and then dried slowly below 100° C. then at 110° C. It was finally calcined at 550° C.

Impregnation with ammonium molybdate was then carried out by soaking at ambient temperature in an ammoniacal solution of ammonium molybdate containing 80 grammes per litre, with about twice the theoretical quantity of molybdate and for a period of 6 hours. The alumina was then allowed to drain, dried and calcined as above. The impregnation with cobalt nitrate was finally carried out by soaking at ambient temperature in a solution of cobalt nitrate containing 100 grammes per litre, with twice the theoretical quantity of cobalt for a period of 18 hours. The alumina was finally allowed to drain, dried and calcined as above.

The catalyst thus prepared had the following composition:

|  | Percent |
|---|---|
| $Fe_2O_3$ | 11.8 |
| $MoO_3$ | 8.5 |
| CoO | 2.6 | on an alumina support.

The catalyst was then placed in service in a continuously operating hydrogenation reactor, while feeding a Kuwait spindle oil dewaxed only, under the following conditions:

| | |
|---|---|
| Temperature | 325° C. |
| Oil feed rate | 1 vol. per vol. of catalyst per hour. |
| Pressure | 20 atmospheres. |
| Hydrogen feed rate | 20 vol. per vol. of oil per hr. |
| Duration | 48 hours. |

After this activation treatment, the temperature was lowered to 275° C. and the treated oil then had a colour stability expressed by an index of reversion of 1.28.

The following are examples of preparing a catalyst of the same composition as in Example IV but by different methods from that according to the invention.

These catalysts were activated as in Example IV, by hydrogenation of the same spindle oil at 325° C. and the treatment of this oil was then carried out at 275° C. giving the stabilities expressed by the indices of reversion as follows:

| | Method of preparation | Index of reversion |
|---|---|---|
| Example V | Co-precipitation of the oxide of iron and of alumina from the nitrates. Drying-Calcination-Granulating. Impregnation with ammonium molybdate and cobalt nitrate. Drying—Calcination. | 1.55 |
| Example VI | Agglomeration of a powder consisting of a mixture of activated alumina and of ammonium molybdate by means of a solution of the nitrates of iron and cobalt. Drying—Calcination. | 1.70 |
| Example VII | Agglomeration of a powder of activated alumina by means of a solution of ferric nitrate. Impregnation with a solution of ammonium molybdate and cobalt nitrate. Drying—Calcination. | 1.50 |
| Example VIII | Co-precipitation of the hydroxides of iron, cobalt and aluminium from the corresponding nitrates. Drying—Calcination—Granulation. Impregnation with a solution of ammonium molybdate.—Drying—Calcination. | 1.90 |
| Example IX | Impregnation of granular activated alumina with a solution of ammonium molybdate. Drying. Impregnation with a solution of the nitrates of iron and cobalt. Drying—Calcination. | 1.40 |
| Example X | Mixture of hydroxides of iron, cobalt, molybdenum and aluminium freshly precipitated and wet. Drying—Calcination—Pelleting. | 1.50 |

Lastly, the importance of the final activation of the catalyst prepared according to the invention is shown in the following example.

EXAMPLE XI

The same catalyst as in Example IV is placed in service in the same plant which operates under the same conditions and with the same feedstock, but from the beginning a temperature in the region of 275° C. was used, without having activated for 48 hours at 325° C. The oil was thus treated had a colour stability expressed by an index of reversion of 1.6.

The iron-containing catalysts used in Examples I to III were prepared by the method described in Example IV.

The invention in its broader aspects is not limited to the processes and compositions included herein but departures may be made therefrom within the scope of the accompanying claims without departing from the principles of the invention and without sacrificing its chief advantages.

What is claimed is:

1. A process for preparing a catalyst for use in the hydrogenating refining of lubricating oils, comprising first impregnating a catalyst support consisting of activated alumina, said alumina having been previously calcined, with a non-alkaline solution of ferric nitrate, drying and calcining, thereafter impregnating the support with an ammoniacal solution of ammonium molybdate, drying and calcining and thereafter impregnating with a solution of cobalt nitrate, drying and calcining.

2. The process of claim 1 wherein the activated alumina is of the gamma type.

3. The process of claim 1 wherein the support prior to impregnation is calcined at a temperature above 500° C.

4. A process for preparing a catalyst for use in the hydrogenating refining of lubricating oils, comprising first impregnating a catalyst support consisting of activated alumina, said alumina having been previously calcined, with a non-alkaline solution of ferric nitrate, drying and calcining, then impregnating the support with an ammoniacal solution of ammonium molybdate, and a solution of cobalt nitrate, then drying and calcining and then activating the resulting catalyst by contact in the presence of hydrogen with a mineral oil having a high sulfur content at a temperature of at least 300° C. for at least 24 hours.

5. A process according to claim 4 wherein an non-alkaline solution of ferric nitrate is the acid solution of ferric nitrate and wherein the support impregnated with said ammoniacal solution of ammonium molybdate is dried and calcined before finally impregnating the support with the solution of cobalt nitrate.

6. The process of claim 4 wherein the support prior to impregnation is calcined at a temperature above 500° C.

7. The process of claim 4 wherein the alumina support is prepared prior to impregnation by calcination of hydrargillite at a temperature above 500° C.

8. A process for preparing a catalyst for use in the hydrogenating refining of lubricating oils, comprising first impregnating a catalyst support consisting of activated alumina, said alumina having been previously calcined, with a non-alkaline solution of ferric nitrate, drying and calcining, then impregnating the support with an ammoniacal solution of ammonium molybdate, and a solution of cobalt nitrate, and then drying and calcining.

9. The process of claim 8 wherein the activated alumina support is prepared by calcination of hydrargillite at a temperature above 500° C.

References Cited by the Examiner

UNITED STATES PATENTS

| 2,654,696 | 10/53 | La Porte | 208—264 |
| 2,880,171 | 3/59 | Flinn et al. | 208—216 |
| 2,905,636 | 9/59 | Watkins et al. | 208—216 |
| 3,020,228 | 2/62 | Demeester | 208—216 |

DELBERT E. GANTZ, *Primary Examiner.*

ALPHONSO D. SULLIVAN, *Examiner.*

UNITED STATES PATENT OFFICE
CERTIFICATE OF CORRECTION

Patent No. 3,205,180 September 7, 1965

Jacques Demeester

It is hereby certified that error appears in the above numbered patent requiring correction and that the said Letters Patent should read as corrected below.

Columns 5 and 6, Table 2, eighth column, line 10 thereof, for "3 1/2-" read -- 2 1/2- --; column 8, line 36, strike out "was".

Signed and sealed this 29th day of March 1966.

ERNEST W. SWIDER
Attesting Officer

EDWARD J. BRENNER
Commissioner of Patents